(12) United States Patent
Youn et al.

(10) Patent No.: US 11,984,734 B2
(45) Date of Patent: May 14, 2024

(54) WIRELESS POWER TRANSMISSION/RECEPTION APPARATUS AND DISPLAY SYSTEM INCLUDING THE SAME

(71) Applicant: LG ELECTRONICS INC., Seoul (KR)

(72) Inventors: Jinho Youn, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 17/616,752

(22) PCT Filed: Feb. 27, 2020

(86) PCT No.: PCT/KR2020/002842
§ 371 (c)(1),
(2) Date: Dec. 6, 2021

(87) PCT Pub. No.: WO2021/006454
PCT Pub. Date: Jan. 14, 2021

(65) Prior Publication Data
US 2022/0337097 A1 Oct. 20, 2022

(30) Foreign Application Priority Data

Jul. 5, 2019 (KR) .................. 10-2019-0081461

(51) Int. Cl.
*H02J 50/30* (2016.01)
*G02B 27/09* (2006.01)
*H01S 3/00* (2006.01)

(52) U.S. Cl.
CPC .......... *H02J 50/30* (2016.02); *G02B 27/0916* (2013.01); *G02B 27/0927* (2013.01); *G02B 27/0944* (2013.01); *H01S 3/005* (2013.01)

(58) Field of Classification Search
CPC . H02J 50/30; G02B 27/0916; G02B 27/0927; G02B 27/0944; G02B 27/0955;
(Continued)

(56) References Cited

U.S. PATENT DOCUMENTS 6,534,705 B2 * 3/2003 Berrios ..................... F03H 3/00
323/221
10,488,549 B2 * 11/2019 Kare ....................... G01S 7/003
(Continued)

FOREIGN PATENT DOCUMENTS

CN 106875843 A 6/2017
CN 107834715 A 3/2018
(Continued)

*Primary Examiner* — Seung C Sohn
(74) *Attorney, Agent, or Firm* — Birch, Stewart, Kolasch & Birch, LLP

(57) ABSTRACT

The present disclosure provides a display system including: a display apparatus; a wireless power reception apparatus configured to supply power to the display apparatus; and a wireless power transmission apparatus configured to emit a laser beam toward the wireless power reception module, wherein the wireless power reception module is formed as a bar type; and the wireless power transmission module comprises a light source configured to emit light of a specific wavelength as a laser beam, and a light shaping unit configured to shape the light of the light source and to convert the shaped light into a laser beam having a different cross-section and output the laser beam. Accordingly, by performing wireless power transmission using laser light, which satisfies the electromagnetic interference (EMI) requirements, wireless power may be transmitted to high-quality wall-mounted TVs and AV devices.

11 Claims, 8 Drawing Sheets

(58) Field of Classification Search
CPC ..... G02B 26/002; G02B 27/095; H01S 3/005; H01S 5/005
See application file for complete search history.

(56) References Cited

U.S. PATENT DOCUMENTS

| | | |
|---|---|---|
| 2011/0141381 A1 | 6/2011 | Minikey, Jr. et al. |
| 2015/0311755 A1 | 10/2015 | Hiebl et al. |
| 2017/0018976 A1 | 1/2017 | Mor et al. |
| 2020/0091774 A1 | 3/2020 | Kim et al. |

FOREIGN PATENT DOCUMENTS

| | | |
|---|---|---|
| DE | 10 2017 217 145 A1 | 3/2019 |
| JP | 2004-151346 A | 5/2004 |
| KR | 10-2012-0009929 A | 2/2012 |
| KR | 10-2015-0090964 A | 8/2015 |
| KR | 10-2018-0006170 A | 1/2018 |
| KR | 10-2018-0041134 A | 4/2018 |
| KR | 10-2018-0067144 A | 6/2018 |
| WO | WO 2013/112185 A2 | 8/2013 |

\* cited by examiner

[FIG. 1]
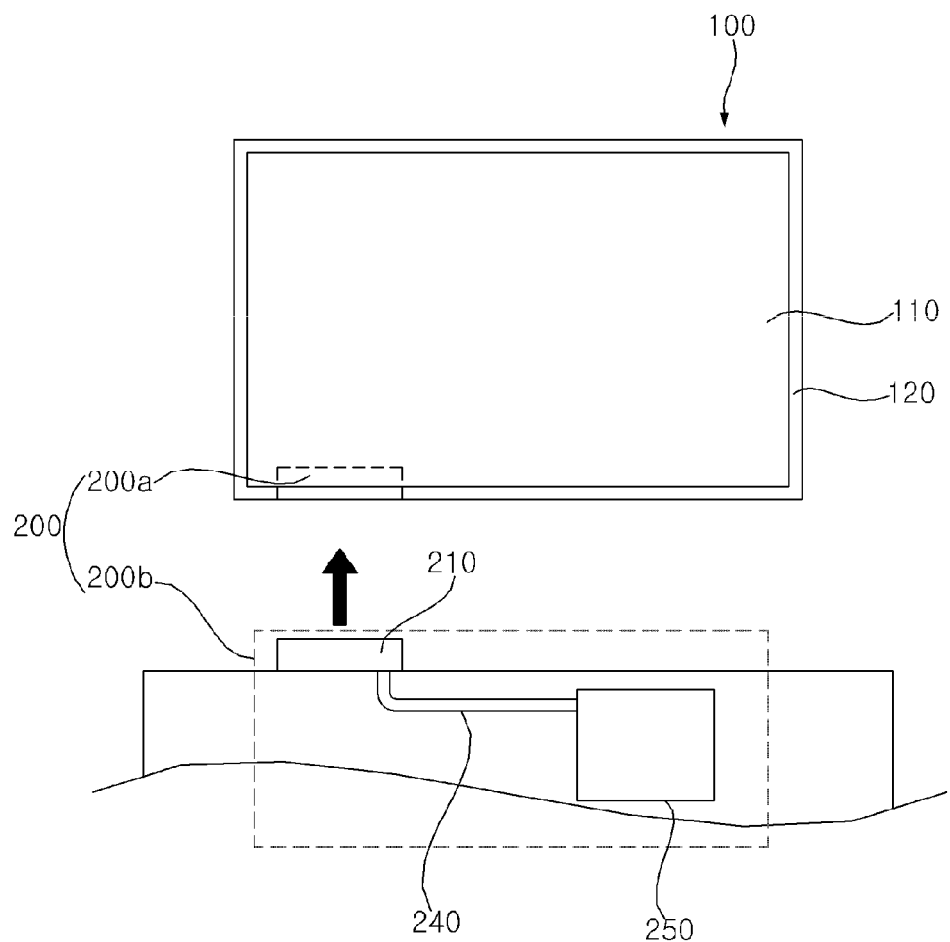

[FIG. 2]
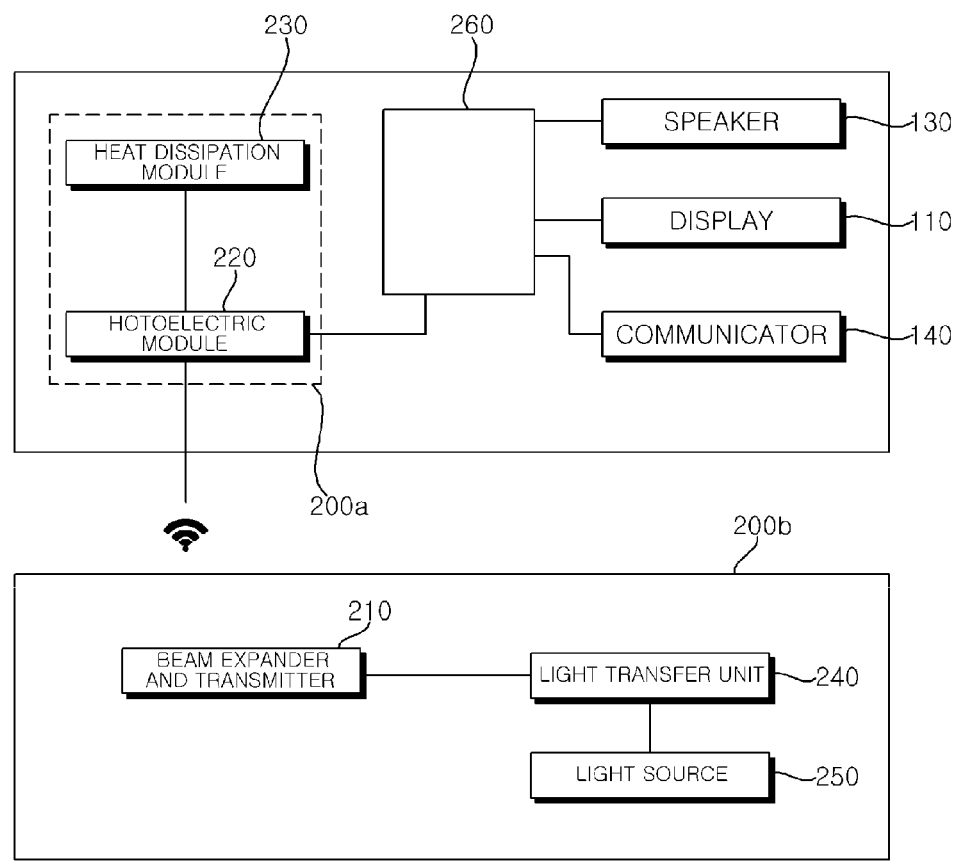

[FIG. 3]
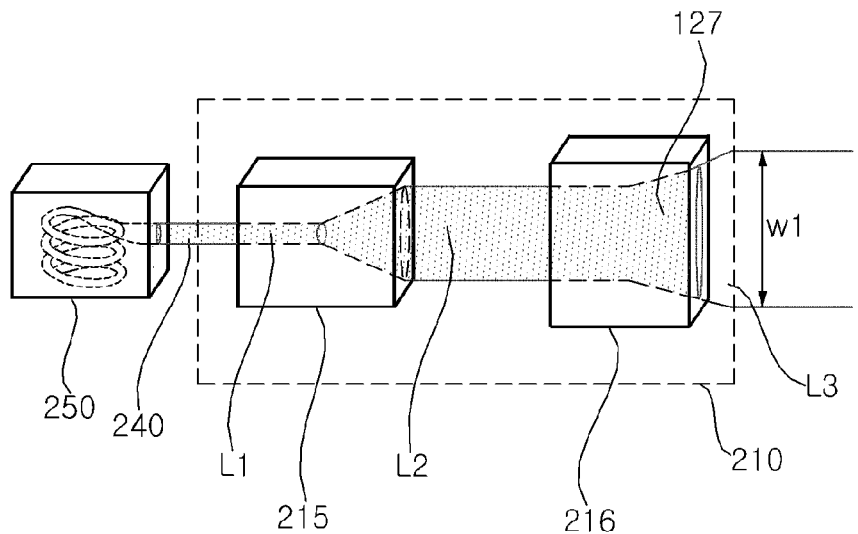
[FIG. 4a]
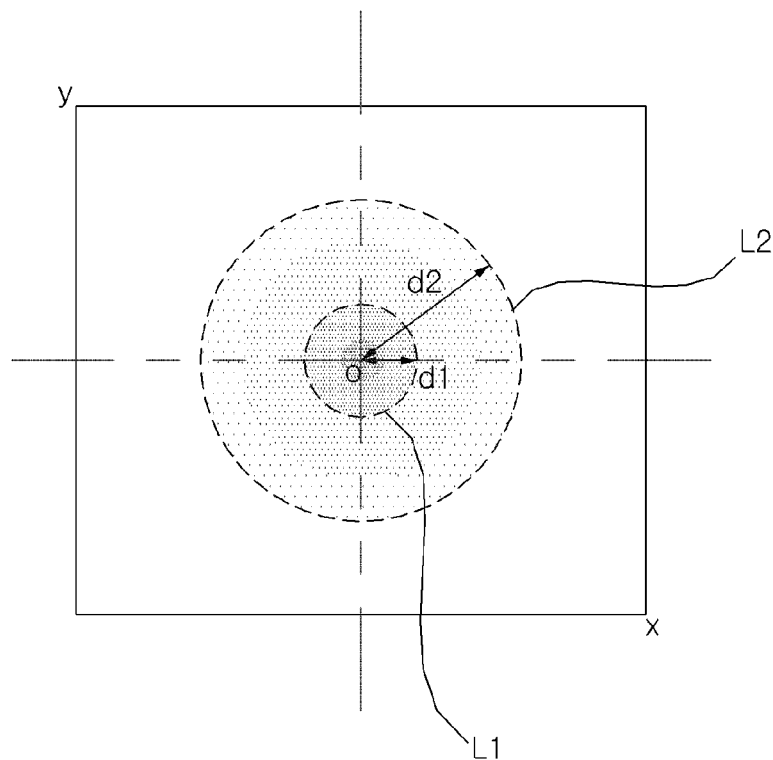

[FIG. 4b]
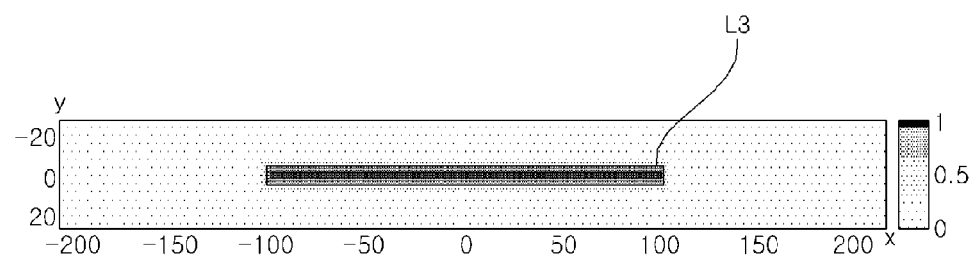
[FIG. 5a]
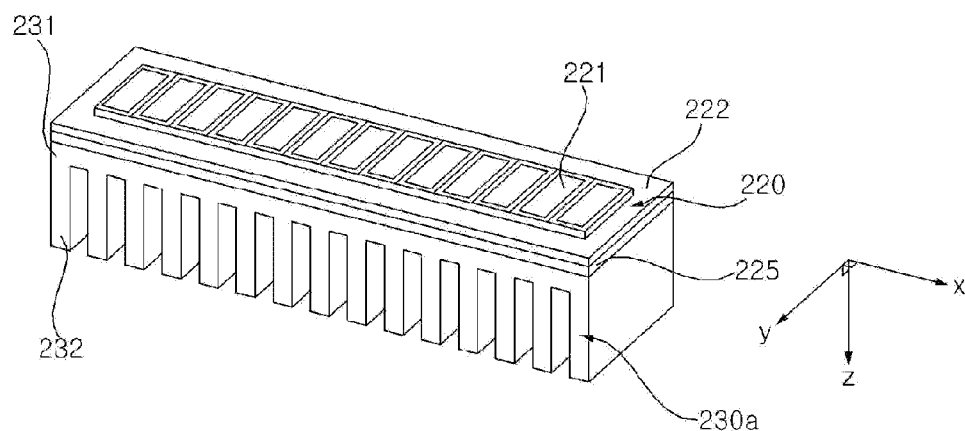

[FIG. 5b]
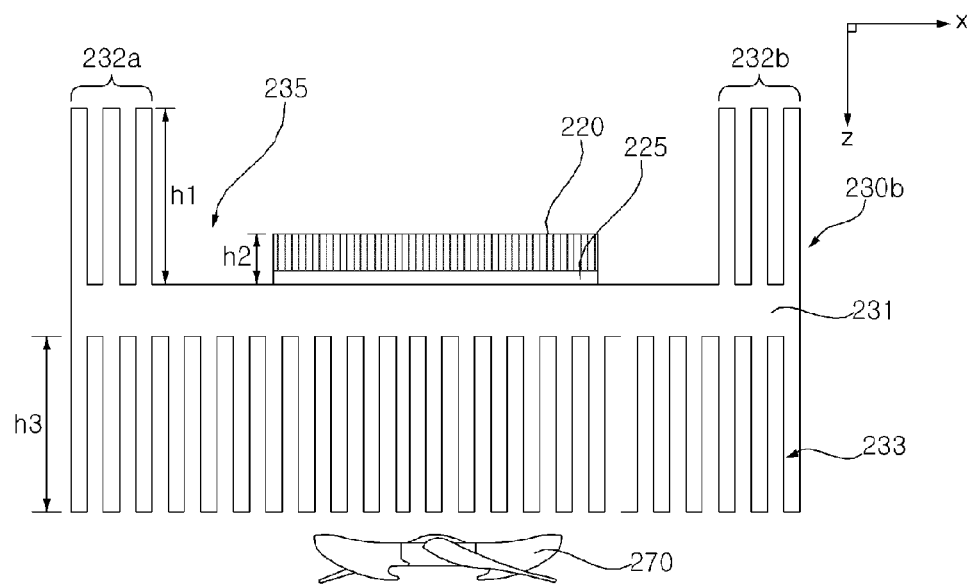
[FIG. 5c]
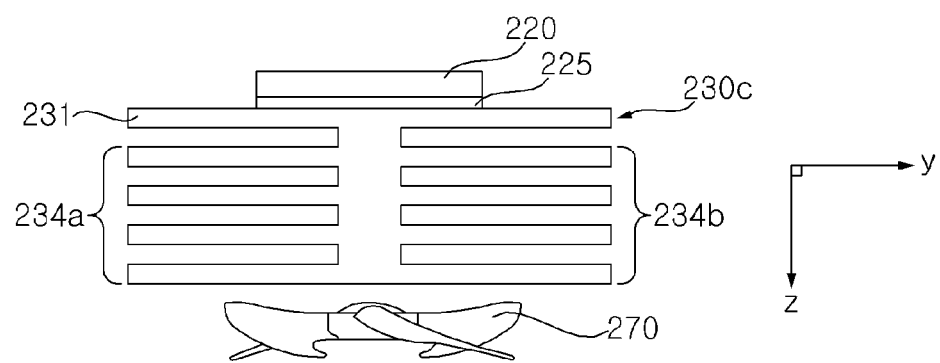

[FIG. 5d]
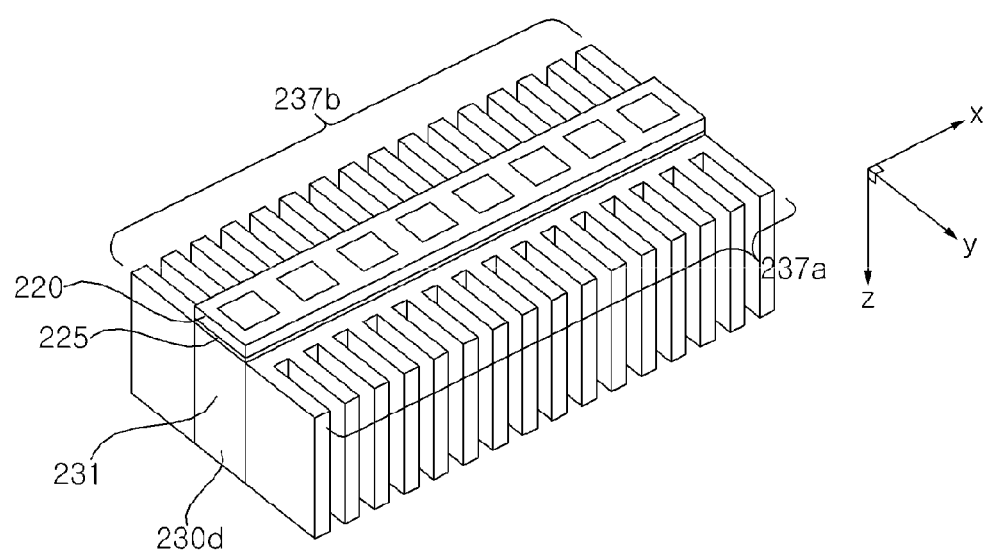

[FIG. 6]
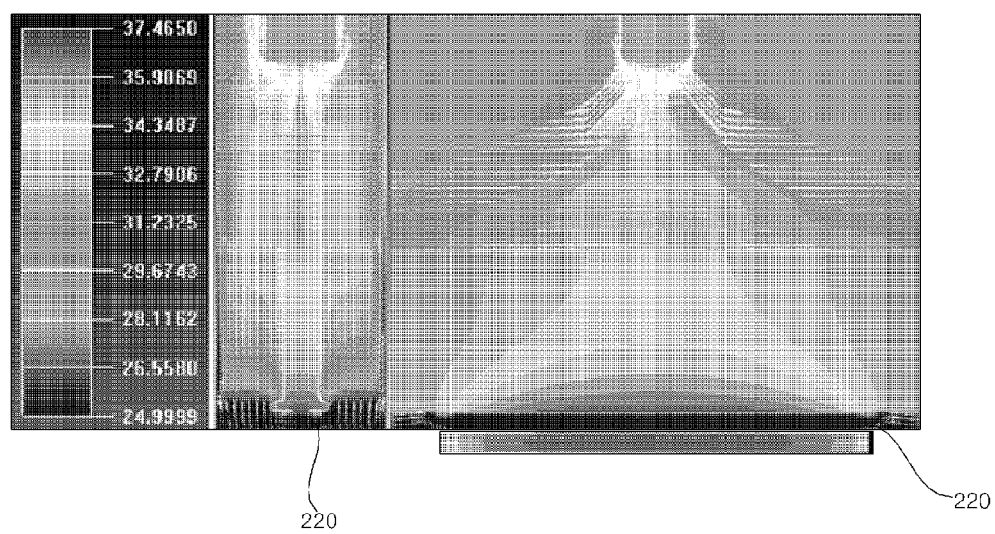

[FIG. 7]
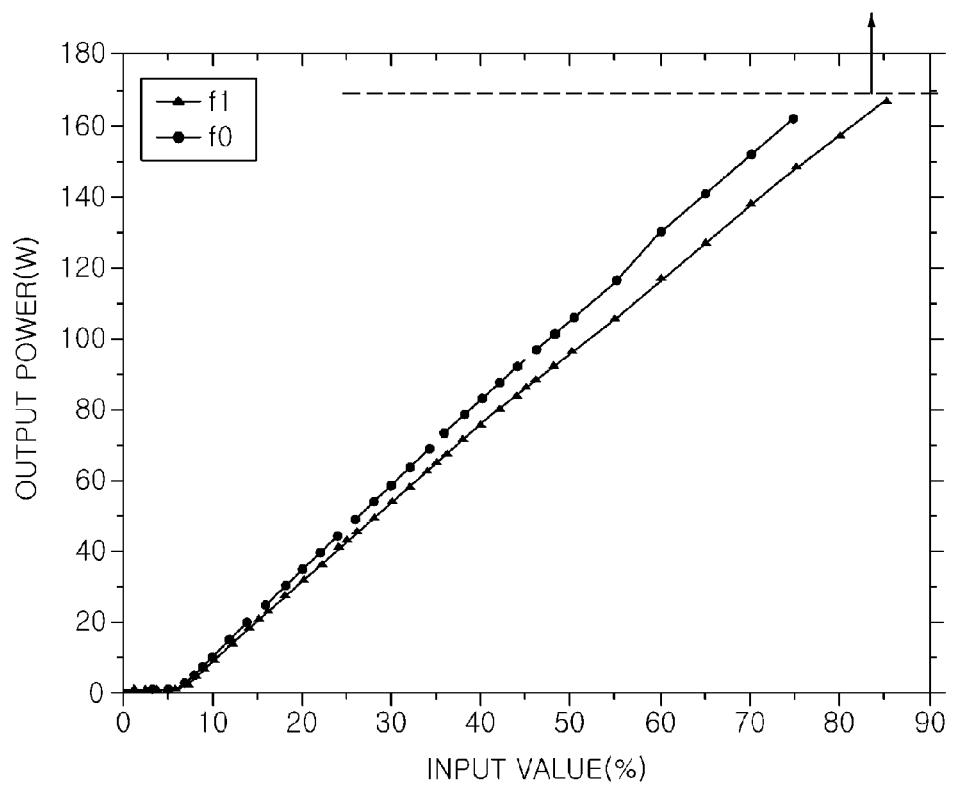

WIRELESS POWER TRANSMISSION/RECEPTION APPARATUS AND DISPLAY SYSTEM INCLUDING THE SAME

CROSS REFERENCE TO RELATED APPLICATIONS

This application is the National Stage filing under 35 U.S.C. 371 of International Application No. PCT/KR2020/002842, filed on Feb. 27, 2020, which claims the benefit of earlier filing date and right of priority to Korean Application No. 10-2019-0081461, filed on Jul. 5, 2019 in the Republic of Korea, the entire contents of all these applications being hereby expressly incorporated by reference into the present application.

BACKGROUND OF THE INVENTION

1. Field of the Invention

The present disclosure relates to a wireless power transmission/reception apparatus, and more particularly to a high-power wireless power transmission/reception apparatus applicable to a display apparatus.

2. Description of the Related Art

An image display apparatus is an apparatus for outputting images to a user. The image display apparatus may output images by various methods, including a method of outputting images on a display panel or a method of externally projecting images using visible light and the like.

As the image display apparatus becomes larger in size and high quality, the display of the image display apparatus is provided apart from a signal processing apparatus that supplies a video signal to the display.

Meanwhile, as it is essential to supply power to various electronic devices, the electronic devices are supplied with power by connecting electrical cords (power connection cable) of the respective electronic devices into outlets. In this case, many electrical cords have negative effects in terms of management, security, and space use.

In this regard, research is conducted on a power transmission method using wireless power that may minimize electrical cords while providing various functions of electronic devices.

In this case, regarding power transmission using wireless power to the image display apparatus, particularly, Korean Laid-Open Patent Publication No. 10-2018-0089763 discloses a method of transmitting wireless power to an image display apparatus for displaying images on a wall-mounted TV.

However, the power transmission using a magnetic field has structural limitations in that it is required to increase the intensity of the magnetic field as a transmission distance increases, such that the transmission distance and transmission power may increase, making it difficult to satisfy the electromagnetic interference (EMI) requirements.

Unlike the method, U.S. Pat. No. 8,525,097B2 discloses a method for long-distance power transmission, in which by providing a Retro-Reflector on both sides of an energy transmitter and receiver, optical energy is pumped in a free space, thereby allowing energy transmission with increased energy density.

However, the method has problems in that the use of Retro-Reflector requires high costs, and in practice, energy may not be pumped in a free retro-space without causing a loss in the air.

Meanwhile, U.S. Patent Publication No. US2017/0047790 A1 discloses wireless power transmission for military flights, such as a drone and an unmanned aerial vehicle (UAV), in military fields by using a laser beam.

However, the related art relates to a method of mainly tracking moving or traveling equipment, in which an energy transmission method includes: identifying an object, to which energy is to be transmitted using object recognition equipment, such as a laser scanner and a camera; and then transmitting laser energy to an exact position by using the information.

That is, the related art focuses on wireless power transmission by identifying a moving object, without considering efficiency and costs of power transmission, thereby causing problems with efficiency and costs.

PRIOR ART DOCUMENT

Patent Documents

U.S. Pat. No. 8,525,097B2 (published on Dec. 23, 2010)
U.S. Patent Publication No. US2017/0047790 A1 (published on Feb. 16, 2017)

SUMMARY OF THE INVENTION

It is a first object of the present disclosure to provide a power transmission method that satisfies the electromagnetic interference (EMI) requirements.

It is a second object of the present disclosure to provide a method of wireless power transmission to high-quality wall-mounted TVs and AV devices by using laser-based middle- and long-distance power transmission techniques.

It is a third object of the present disclosure to provide a system for converting electricity into invisible optical energy, except visible light.

It is a fourth object of the present disclosure to provide a method of transmitting invisible optical energy to a desired target, and transmitting the optical energy to an identified position regardless of loss/distance.

It is a fifth object of the present disclosure to provide a method of converting the transmitted optical energy into electrical energy, and cooling the heat generated during the conversion, thereby guaranteeing efficiency.

In accordance with an aspect of the present disclosure, the above and other objects can be accomplished by providing a bar-type wireless power transmission/reception apparatus including: a light source configured to emit light of a specific wavelength as a laser beam; and a light shaping unit configured to shape the light of the light source and to convert the shaped light into a laser beam having a different cross-section and output the laser beam.

The light source may generate a laser beam in an infrared wavelength range.

Upon receiving a laser beam having a circular cross-section from the light source, the light shaping unit may shape the laser beam into a laser beam having a rectangular cross-section and may output the laser beam having the rectangular cross-section.

The light shaping unit may include: a beam expander configured to convert a circular laser beam having a first diameter, which is received from the light source, into a circular laser beam having a second diameter; and a diffractive optical element (DOE), which upon receiving the circular laser beam having the second diameter from the beam expander, may be configured to shape the circular laser beam into a laser beam having a rectangular cross-section and to output the laser beam having the rectangular cross-section.

The second diameter may be an integer multiple of the first diameter.

In accordance with another aspect of the present disclosure, the above and other objects can be accomplished by providing a display system including: a display apparatus; a wireless power reception apparatus configured to supply power to the display apparatus; and a wireless power transmission apparatus configured to emit a laser beam toward the wireless power reception module, wherein the wireless power reception module is formed as a bar type; and the wireless power transmission module includes a light source configured to emit light of a specific wavelength as a laser beam, and a light shaping unit configured to shape the light of the light source and to convert the shaped light into a laser beam having a different cross-section and output the laser beam.

The light source may generate a laser beam in an infrared wavelength range.

Upon receiving a laser beam having a circular cross-section from the light source, the light shaping unit may shape the laser beam into a laser beam having a rectangular cross-section and may output the laser beam having the rectangular cross-section.

The light shaping unit may include: a beam expander configured to convert a circular laser beam having a first diameter, which is received from the light source, into a circular laser beam having a second diameter; and a diffractive optical element (DOE), which upon receiving the circular laser beam having the second diameter from the beam expander, may be configured to shape the circular laser beam into a laser beam having a rectangular cross-section and to output the laser beam having the rectangular cross-section.

The second diameter may be an integer multiple of the first diameter.

The display apparatus may include: a display configured to display images; and a bezel surrounding the display.

The wireless power reception module may be formed as a bar type on the bezel.

The wireless power reception module may include: a bar-type photoelectric module disposed facing the wireless power transmission module; and a heat dissipation module coming into contact with the photoelectric module and configured to dissipate heat of the photoelectric module to outside thereof.

The photoelectric module may include a plurality of photodiodes arranged in a longitudinal direction of the bar-type photoelectric module, and the photodiodes may receive the laser beam and may convert the laser beam into an electrical current.

The heat dissipation module may include: a support coming into contact with the photoelectric module; and a dissipating part protruding from the support and dissipating heat of the support.

The dissipating part may include a plurality of heat dissipation fins protruding from a lower side of the support and arranged in a row.

The dissipating part may further include a plurality of heat dissipation fins protruding around the photoelectric module on an upper side of the support.

The support may include a plurality of heat dissipation fins protruding by a predetermined length from a lower side of the photoelectric module and protruding from a side surface of the support.

The wireless power transmission module may be spaced apart from the wireless power reception module by a predetermined distance.

Effects of the Invention

According to embodiments of the present disclosure, by performing wireless power transmission using laser light, which satisfies the electromagnetic interference (EMI) requirements, wireless power may be transmitted to high-quality wall-mounted TVs and AV devices.

Further, by providing electricity after converting the electricity into invisible optical energy except visible light, power may be transmitted without causing any discomfort to a user, and by transmitting invisible optical energy to a desired target, and transmitting the optical energy to an identified position, power may be transmitted while minimizing a loss. In addition, by converting the transmitted optical energy into electrical energy, and cooling the heat generated during the conversion, efficiency may be guaranteed.

BRIEF DESCRIPTION OF THE DRAWINGS

FIG. 1 is a diagram illustrating a display apparatus according to an embodiment of the present disclosure.

FIG. 2 is a block diagram illustrating a wireless power transmission/reception apparatus of FIG. 1.

FIG. 3 is a diagram illustrating a configuration of a wireless power transmission module of FIG. 1.

FIGS. 4A and 4B are diagrams illustrating a changing shape of light in the wireless power transmission module of FIG. 3.

FIGS. 5A to 5D are diagrams illustrating various embodiments of the wireless power reception module of FIG. 2.

FIG. 6 is a diagram illustrating heat generated in the wireless power reception module of FIG. 5D.

FIG. 7 is a graph of output efficiency in an optical array of the wireless power transmission module of FIG. 2.

DETAILED DESCRIPTION OF THE PREFERRED EMBODIMENTS

In the following description, the terms indicating directions, such as "front (F)," "rear (R)," "left (Le)," "right (RI)," "up (U)," "down (D)," and the like, are defined as illustrated in the drawings. These terms, however, are merely used to provide a better understanding of the present disclosure, and it is apparent that the directions can be defined differently depending on location of a reference point.

The terms, "first," "second," etc., used in this disclosure, do not necessarily denote any order, importance, or hierarchy, but rather the terms are used to merely distinguish one element from another. For example, an invention may be configured to include only a second element without a first element.

In the drawings, the thickness or size of each layer is exaggerated, omitted, or schematically illustrated for convenience of description and clarity. Also, the size or area of each constituent element does not entirely reflect the actual size thereof.

Further, angles and directions referred to in the description of a structure of the present disclosure may be described with reference to illustration in the drawings. In the description of the structure, if reference points with respect to the angles and positional relations are not clearly stated, the related drawings may be relied upon.

With reference to FIGS. 1 and 2, the following description will be given using a display system including a wireless power transmission/reception apparatus as an example, but the present disclosure is not necessarily limited thereto.

Hereinafter, a display system including a wireless power transmission/reception apparatus will be described with reference to the accompanying drawings. FIG. 1 is a diagram illustrating a display system according to an embodiment of the present disclosure; and FIG. 2 is a block diagram illustrating a wireless power transmission/reception apparatus of FIG. 1.

Referring to FIG. 1, the display system may include: a wireless power reception module 200a; and a display apparatus 100 configured to receive power from a wireless power transmission apparatus and the wireless power reception module 200a. The display apparatus 100 may be configured to receive power through a wire from the wireless power reception module 200a.

The display apparatus 100 may functionally include: a display 110 disposed on a front surface thereof and displaying images based on image data; a speaker 130 generating voice to the outside based on audio data; a communicator 140 communicating with an external device; and a processor (not shown) receiving power from the wireless power reception module 200a and controlling functional modules.

The display 110, including modules such as LCD, LED, OLED, etc., may be secured by a bezel 120 forming a frame and may display images.

The wireless power reception module 200a may be formed on a lower rear surface of the bezel 120, and the wireless power reception module 200a may be installed with a portion thereof being exposed to the bottom of the bezel 120. By wirelessly receiving power from the wireless power transmission module 200b, the wireless power reception module 200a may supply power to various modules of the display apparatus 100 through the controller 260.

In this case, the wireless power reception module 200a includes a plurality of photodiodes arranged in an array, and receives laser light from the wireless power transmission module 200b and generates power by photoelectric conversion of the laser light.

The display apparatus 100 may include a bar-type wireless power reception module 200a extending in a longitudinal direction on a lower end of the bezel 120 and on a rear surface of the display apparatus 100, without having a separate electric wire for power supply. Accordingly, having no electric wire or plug which are exposed to the outside, the display apparatus 100 facilitates wiring when applied to wall-mounted TVs and the like.

Meanwhile, the wireless power transmission module 200b is spaced apart from the wireless power reception module 200a, so as to be disposed opposite to the wireless power reception module 200a of the display apparatus 100.

The wireless power transmission module 200b may be disposed on various support surfaces, which may be furniture or an electric device such as a set-top box, which are disposed on a lower end of the display apparatus 100 as illustrated in FIG. 1, and may not be electrically connected to the wireless power transmission module 200b.

The wireless power transmission module 200b may be divided into a plurality of modules. Specifically, the wireless power transmission module 200b may include a light source 250 generating a laser beam, and a beam expander and transmitter 210 for wirelessly transmitting the laser beam, generated by the light source 250, as energy to the wireless power reception module 200a may be provided separately. Further, the wireless power transmission module 200b may include a light transfer unit 240 to transfer light between the light source 250 and the beam expander and transmitter 210.

The light transfer unit 240 may be implemented as optical fibers, and by total reflection of optical energy, generated by the light source 250, in the optical fibers, the light transfer unit 240 transfers the optical energy to the beam expander and transmitter 210.

The light source 250 is a module for generating a laser beam of a specific wavelength, and an example thereof may include a laser diode for generating an infrared laser beam having high energy.

The laser diode for generating the infrared laser beam is laser emitting light in a wavelength range of 0.8 μm to 1000 μm, and may be preferably gallium arsenide semiconductor laser emitting light at a wavelength of 0.9 μm, or glass laser and YAG laser at a wavelength of 1.06 μm.

More preferably, the laser diode may be gallium arsenide infrared laser emitting light in a wavelength range of 970 μm to 980 μm, in which the laser device is a heterojunction laser of GaAs and GaAlAs operating at room temperature and capable of high output power.

In the heterojunction laser, the injected carrier is trapped in a heterojunction potential barrier, which increases the density such that population inversion easily occurs, and laser emission is performed.

In the heterojunction laser, a refractive index of GaAs at the center is greater than a refractive index of materials on both sides, such that the generated light is trapped inside the center portion, thereby reducing a threshold current required for the emission, in conjunction with the aforementioned carrier encapsulation effect.

The light source 250 is a module for generating a laser beam of a specific wavelength, and an example thereof may include optical fiber laser generating an infrared laser beam having high energy.

The optical fiber laser for generating the infrared laser beam includes a laser diode as a light pump for emitting light in a wavelength range of 0.8 μm to 1000 μm, and is connected to the laser diode to generate the laser beam by reflecting and amplifying light emitted from the laser diode.

In this case, the optical fiber laser may include a doped medium. As a doped material, Erbium may be included which is a rare earth material. By using the doped material, the optical fiber laser may absorb photons having a wavelength of 900 nm and emitted from the laser diode, so as to generate light in a higher wavelength range.

In this case, the material to be doped may be selected according to a wavelength of the emitted light, and the material is not limited thereto.

The light source 250 may include the optical fiber connected to the laser diode, and may emit an infrared laser beam of a specific wavelength according to the length of the optical fiber. The laser beam, which is output from one end of the optical fiber, i.e., the head of the optical fiber connected to the beam expander and transmitter 210, may have power greater than or equal to 1000 W.

In this case, the connected optical fiber is exposed to the outside of modules included in the light source 250, to be connected to the beam expander and transmitter 210 to transfer light from the light source 250 to the beam expander and transmitter 210 through the head of the optical fiber.

The light source 250 may be formed as a large capacity module, and is connected to beam expander and transmitter 210 through the optical fiber, such that the light source 250 may be spaced apart by a desired distance from the beam expander and transmitter 210 and may be embedded.

Accordingly, as the transmission module 200b for transmitting wireless power to a large area display apparatus 100, only a module included in the beam expander and transmitter 210 and facing a lower portion of the display apparatus 100 may be exposed to the outside.

The beam expander and transmitter 210 may have a structure as illustrated in FIG. 3.

Referring to FIG. 3, the beam expander and transmitter 210 may include a beam expander 215 and a beam shaping unit 216. In the beam expander and transmitter 210, a plurality of lenses forming the beam expander 215 and the beam shaping unit 216 are accommodated in a case, and the beam expander and transmitter 210 is an optical module having a shielding structure to prevent light leakage to the outside.

The beam expander and transmitter 210 may have an opening 127 which has a predetermined width, and through which shaped light is transmitted to an upper surface. The width s1 of the opening 127 may be of a bar type having a length of 150 mm to 250 mm. The width w1 of the opening 127 may be preferably in a range of 190 mm to 210 mm, and the case of the beam expander and transmitter 210 may have the width s1 of the opening 127 as an upper width, and a cross section of a side surface of about 130 mm*100 mm.

The beam expander 215 and the beam shaping unit 216 in the case may be implemented as a plurality of lenses which expand the size of light transmitted from the head of the optical fiber serving as the light transfer unit 240, or which emit light after changing a shape of the light.

The beam expander 215 is connected to the head of the optical fiber serving as the light transfer unit 240, and is implemented as lenses that receive light of a specific wavelength from the head of the optical fiber and emit light after expanding a cross section of the light.

The beam expander 215 may expand the light as illustrated in FIG. 4A.

That is, referring to FIG. 4A, light L1 emitted from the head of the optical fiber is infrared laser light having a circular cross section, and the circular cross-section of the light L1 has a diameter that satisfies d1, as illustrated in FIG. 4A.

By measuring the size of the cross section of the light L1 with a beam profiler being disposed in front of the head of the optical fiber, a shape of the cross section of the laser light may be measured.

The laser light is converted into light having a cross section with a predetermined area according to an expansion coefficient set by the beam expander 215.

The expansion coefficient may be any integer, but is not limited thereto.

For example, if the expansion coefficient is set to twice the size of the cross section by the beam expander 215, light L2 refracted by the lens of the beam expander 215 is emitted as output light having a diameter that satisfies d2.

The output light L2 having an expanded diameter converges to the beam shaping unit 216.

The beam shaping unit 216 is an optical element which is a Homogenizer DOE (Diffractive Optical Element), and the DOE is an element that forms and splits a laser beam in an energy efficient manner.

The beam shaping unit 216 is a diffractive beam shaping element, and changes a shape by shaping a spatially constant concentration and phase profile of a laser beam. By manipulating an incident phase of input light, in effect infinite and unstained concentration image of the output light may be obtained, such that the input light formed in a desired shape may be output while achieving efficiency.

The beam shaping unit 216 may include a homogenizer and a diffractive light diffuser, which output light L3 having a rectangular cross-section as illustrated in FIG. 4B.

In this case, the rectangular cross-section of the light L3 may be of a bar type having a width in a range of 150 mm to 250 mm, which is identical to the width w1 of the opening 127 of the case. In this case, the width may be preferably in a range of 190 mm to 210 mm, and the length thereof may be in a range of 10 mm to 15 mm, and preferably in a range of 11 mm to 12 mm.

As described above, when receiving the light L3 having a circular cross-section, and shaping the light L3 to have a rectangular cross section of a bar type and outputting the shaped light L3, the light L3 may be set in a manner that minimizes an optical loss caused by the shaping of the light L3, which satisfies a condition that the optical loss is 10% or less.

As described above, the light L3 transmitted through the opening 127 of the beam expander and transmitter 210 to the wireless power reception module 200a of the display apparatus 100 may be infrared laser light having a rectangular cross-section of a bar type, as illustrated in FIG. 4B.

The laser beam has power of at least 100 w to 200 w as optical energy, and by transmitting wireless power as optical energy, wireless power may be transmitted without being significantly affected by a distance to the wireless power reception module 200a.

For example, a distance between the wireless power transmission module 200b and the wireless power reception module 2000a may be between 0.5 m to 1.5 m, but is not limited thereto.

Referring to FIGS. 2 and 5, the wireless power reception module 200a of the present disclosure includes a photoelectric module 220 a heat dissipation module 230.

The wireless power reception module 200a may be implemented with the photoelectric module 220, disposed opposite to the opening 127 of the wireless power transmission module 200b, and receiving laser light, emitted through the opening 127 and having a rectangular cross-section of a bar type and photoelectrically converting the laser light; and the heat dissipation module 230 for dissipating heat, generated from the photoelectric module 220, to the outside.

The photoelectric module 220 and the heat dissipation module 230 may be formed in various shapes, and may be physically in contact with each other or may be disposed adjacent to each other so as to dissipate the heat from the photoelectric module 220 to the outside.

FIGS. 5A to 5D are diagrams illustrating various embodiments of the wireless power reception module 200a.

Referring to FIG. 5A, the wireless power reception module 200a of the present disclosure may include the bar-type photoelectric module 220.

The photoelectric module 220 is a cell device that is activated by the received laser light and is converted into an electrical current, and includes a plurality of photoelectric cells 221 which are arrayed in a longitudinal direction of the bar-type photoelectric module 220.

The plurality of photoelectric cells 221 may be formed as a plurality of photodiodes. That is, the photoelectric module 220, including a plurality of photodiodes formed on one substrate, may form one bar-type photoelectric panel. The photoelectric panel may include: a sealing layer for sealing the photoelectric cells 221 by covering the photoelectric cells 221; a front substrate disposed on a front surface of the photodiode on one surface of the sealing layer; and a rear substrate disposed on a rear surface of the photodiode on the other surface of the sealing layer.

For example, the photodiode may include: a semiconductor substrate (e.g., single crystalline semiconductor substrate, more specifically, single crystalline silicon wafer); a first conductivity type region and a second conductivity type region which are formed on the semiconductor substrate and have opposite conductivity types; and a first electrode and a second electrode which are respectively connected thereto. Here, the semiconductor substrate may have a P conductivity type or an N conductivity type with a low doping concentration, and any one of the first and second conductivity type regions may a P conductivity type and the other one thereof may have an N conductivity type. Further, the first and second conductivity type regions may be formed as doping regions formed on a portion of the semiconductor substrate doped with dopants, or may be formed separately on the semiconductor substrate and formed as a semiconductor layer doped with dopants.

Further, a plurality of photodiodes are provided, in which the first electrode of the photodiode and the second electrode of the photodiode, which is adjacent to the first electrode, may be connected to each other by a wire and the like, thereby forming a photoelectric string with a row of a plurality of photoelectric cells 221. Various known structures may be applied to the structure of the photoelectric cells 221 and a connection structure of the plurality of photoelectric cells 221.

As described above, in this embodiment of the present disclosure, an example is illustrated in which the single crystalline silicon semiconductor is used as the photodiodes. However, the present disclosure is not limited thereto.

The sealing layer seals the photodiodes by covering the photodiodes, and blocks moisture or oxygen that may adversely affect the photodiodes. Further, in the photoelectric module 220, constituent components thereof (i.e., the front substrate, photodiodes, and rear substrate may be chemically connected to each other, the rear substrate, sealing, the photodiodes or wire, first sealing), may be integrally formed by lamination and the like in which the constituent components and the front substrate are sequentially stacked, and then are bonded by heat and/or pressure.

The sealing layer may be made of Ethylene-Vinyl Acetate Copolymer Resin (EVA), polyvinyl butyral, silicone resin, ester-based resin, olefin-based resin, and the like. By using various other materials, the sealing layer may be formed by methods, other than lamination.

The front substrate, disposed on the sealing layer, forms the front surface of the photoelectric panel. The front substrate may be made of a material having strength to protect the photodiodes from an external impact and the like, and having light transmissivity allowing light to transmit therethrough. For example, the front substrate may be formed of a glass substrate and the like. In this case, in order to improve strength, the front substrate may be formed of a tempered glass substrate, or may further include various other materials to improve various characteristics. Alternatively, the front substrate may be a sheet or a film made of a resin and the like. That is, the present disclosure is not limited to the material of the front substrate, and the front substrate may be made of various materials.

The rear substrate is disposed on the sealing layer and serves as a layer to protect the photodiodes on the rear surface of the photodiodes, and may perform waterproof, insulation, and UV blocking functions.

The rear substrate may have strength to protect the photodiodes from an external impact and the like, and may have light-transmitting or light-reflecting characteristics depending on a desired photoelectric panel structure. For example, in a structure in which light is incident from the rear substrate, the rear substrate may be made of a light transmitting material; and in a structure in which light is reflected through the rear substrate, the rear substrate may be made of a non-light transmitting material or a reflective material. For example, the rear substrate may be formed as a glass substrate or as a film or sheet. For example, the rear substrate may be made of a Tedlar/PET/Tedlar (TPT) type material or may be made of a Polyvinylidene fluoride (PVDF) resin formed on at least one surface of polyethylene terephthalate (PET), and the like. The Polyvinylidene fluoride (PVDF) is a polymer having a structure of $(CH2CF2)n$, and has a double fluorine molecular structure, thereby having excellent mechanical properties with excellent weather resistance and UV resistance. However, the present disclosure is not limited to the material of the rear substrate and the like.

In order to stably fix the photoelectric panel having a plurality of layers as described above, a frame 222 may be provided, to which an outer portion of the photoelectric panel is fixed. In the drawing, it is illustrated that the entire outer portion of the photoelectric panel is fixed to the frame 222, but the present disclosure is not limited thereto. Accordingly, various modifications may be made, including an example of fixing only a portion of the edge of the photoelectric panel, and the like.

A heat dissipation module 230a is provided for supporting the photoelectric module 220 and for dissipating heat, generated by the photoelectric module 220 during photoelectric conversion, to the outside.

When light is incident from the rear substrate of the photoelectric panel as illustrated in FIG. 5A, the heat dissipation module 230a is attached to the front substrate by an adhesive sheet 225, and is directly attached to the photoelectric module 220, so as to dissipate heat, received by thermal conduction from the photoelectric module 220, to the outside.

The heat dissipation module 230a includes a support 231 for supporting the photoelectric module 220, and a dissipating part 232 protruding from the lower side of the support 231 and dissipating heat of the support 231.

The heat dissipation module 230 may include the support 231 and the dissipating part 232 which are integrally formed with each other as one module, and may be formed by injection molding using one material.

The heat dissipation module 230 may be made of metal having high thermal conductivity, e.g., steel, an alloy including copper, etc., but the material is not limited thereto.

The dissipating part 232 includes a plurality of heat dissipation fins protruding from the lower side of the support 231.

The heat dissipation fins may be formed as fins arranged in a row along the X axis, having a heat dissipating surface with Y and Z axes as sides, and having a small thickness. That is, the plurality of heat dissipation fins may be formed on a lower surface of the support 231 in a comb type structure.

As described above, heat absorbed by the support 231 is dissipated to a space between the heat dissipation fins and to the outside of the end of the heat dissipation fins.

In the drawing, an example is illustrated in which the wireless power reception module 200a has the photoelectric module 220 formed on an upper surface thereof, and the heat dissipation module 230 formed on a lower surface thereof, but the upper and lower surfaces of the display apparatus 100 may be disposed opposite to those of the example, with a light receiving surface of the photoelectric module 220 facing downward.

Accordingly, the photoelectric module 220 is disposed so as to face the opening 217 of the wireless power transmission module 200b which is disposed on the lower side.

Laser light, emitted from the wireless power transmission module 200b and having a rectangular cross-section of a bar type, is absorbed by the photoelectric module 220 of the wireless power reception module 200a and is converted into an electrical current to be converted into various voltages by the controller 260 of FIG. 2.

To this end, the controller 260 may include a dc-dc converter and the like, and appropriate levels of power may be supplied to various modules of the display apparatus 100.

Hereinafter, a wireless power reception module according to another embodiment of the present disclosure will be described below with reference to FIG. 5B.

The photoelectric module 220 is a cell device that is activated by the received laser light and is converted into an electrical current, and includes a plurality of photoelectric cells 221 which are arrayed in a longitudinal direction of the bar-type photoelectric module 220.

The plurality of photoelectric cells 221 may be formed as a plurality of photodiodes. That is, the photoelectric module 220 includes a plurality of photodiodes formed on one substrate, to form one bar-type photoelectric panel. The photoelectric panel may include: a sealing layer for sealing the photoelectric cells 221 by covering the photoelectric cells 221; a front substrate disposed on a front surface of the photodiode on one surface of the sealing layer; and a rear substrate disposed on a rear surface of the photodiode on the other surface of the sealing layer.

The configuration of the photoelectric module 220 is the same as that of FIG. 5A, such that a detailed description thereof will be omitted.

A heat dissipation module 230b is provided for supporting the photoelectric module 220 and for dissipating heat, generated by the photoelectric module 220 during photoelectric conversion, to the outside.

When light is incident from the rear substrate of the photoelectric panel as illustrated in FIG. 5B, the heat dissipation module 230b is attached to the front substrate by an adhesive sheet, and is directly attached to the photoelectric panel, so as to dissipate heat, received by thermal conduction from the photoelectric module 220, to the outside.

The heat dissipation module 230b includes a support 231 for supporting the photoelectric module 220, and a plurality of lower dissipating parts 233 protruding from the lower surface of the support 231 and dissipating heat of the support 231.

The heat dissipation module 230b may include the support 231 and the lower dissipating parts 233 which are integrally formed with each other as one module, and which may be formed by injection molding using one material.

The heat dissipation module 230b may be made of metal having high thermal conductivity, e.g., steel, an alloy including copper, etc., but the material is not limited thereto.

The support 231 may be formed as a metal plate extending from a lower portion of the photoelectric module 220 along the X axis and having a predetermined length along the Z axis.

The lower dissipating part 233 includes a plurality of heat dissipation fins protruding from the lower surface of the support 231.

The heat dissipation fins may be formed as fins protruding from the support 231 along the Z axis, arranged in a row along the X axis, having a heat dissipating surface with Y and Z axes as sides, and having a small thickness. That is, the plurality of heat dissipation fins may be formed on the lower surface of the support 231 in a comb type structure.

The heat dissipation module 230b may further include a plurality of heat dissipation fins 232a and 232b protruding from an upper surface of the support 231.

The heat dissipation fins 232a and 232b may be formed as fins protruding from the upper surface of the support 231 along the Z axis, arranged in a row along the X axis, having a heat dissipating surface with Y and Z axes as sides, and having a small thickness. The heat dissipation fins 232a and 232b, protruding from the upper surface of the support 231, may be disposed to surround the photoelectric module 220, and a height h1 of the upper heat dissipation fins 232a and 232b may be higher than a height h2 of the photoelectric module 220.

In this case, FIG. 5B illustrates an example in which the upper heat dissipation fins 232a and 232b are formed in two groups, each formed on both sides of a minor axis of the photoelectric module 220, but may also be formed on both sides of a major axis. In addition, the upper heat dissipation fins 232a and 232b may be formed to surround all four sides of the photoelectric module 220.

In this case, the length h1 of the upper heat dissipation fins 232a and 232b may be equal to length h3 of the lower heat dissipation fin 233 of the support 231, but the heights h1 and h3 are not limited thereto.

The length h3 of the lower heat dissipation fin 233 may protrude longer than the length h1 of the upper heat dissipation fins 232a and 232b.

The heat dissipation module 230 may further include a heat dissipation fan 270 for circulating heat to the lower side of the lower heat dissipation fins 233.

As described above, heat absorbed by the support 231 is dissipated to a space between the heat dissipation fins 233, 232a, and 232b and to the outside of the end of the heat dissipation fins 233, 232a, and 232b.

In the drawing, an example is illustrated in which the wireless power reception module 200a has the photoelectric module 220 formed on an upper surface thereof, and the heat dissipation module 230b formed on a lower surface thereof, but the upper and lower surfaces of the display apparatus 100 are disposed opposite to those of the example, with a light receiving surface of the photoelectric module 220 facing downward.

Accordingly, the photoelectric module 220 is disposed so as to face the opening 217 of the wireless power transmission module 200b which is disposed on the lower side.

Laser light, emitted from the wireless power transmission module 200b and having a rectangular cross-section of a bar type, is absorbed by the photoelectric module 220 of the wireless power reception module 200a and is converted into an electrical current to be converted into various voltages by the controller 260 of FIG. 2.

To this end, the controller 260 may include a dc-dc converter and the like, and appropriate levels of power may be supplied to various modules of the display apparatus 100.

Hereinafter, a wireless power reception module according to yet another embodiment of the present disclosure will be described below with reference to FIG. 5C.

The photoelectric module 220 is a cell device that is activated by the received laser light and is converted into an electrical current, and includes a plurality of photoelectric cells 221 which are arrayed in a longitudinal direction of the bar-type photoelectric module 220.

The plurality of photoelectric cells 221 may be formed as a plurality of photodiodes. That is, the photoelectric module 220 includes a plurality of photodiodes formed on one substrate, to form one bar-type photoelectric panel. The photoelectric panel may include: a sealing layer for sealing the photoelectric cells 221 by covering the photoelectric cells 221; a front substrate disposed on a front surface of the photodiode on one surface of the sealing layer; and a rear substrate disposed on a rear surface of the photodiode on the other surface of the sealing layer.

The configuration of the photoelectric module 220 is the same as that of FIG. 5A, such that a detailed description thereof will be omitted.

A heat dissipation module 230 is provided for supporting the photoelectric module 220 and for dissipating heat, generated by the photoelectric module 220 during photoelectric conversion, to the outside.

When light is incident from the rear substrate of the photoelectric panel as illustrated in FIG. 5C, the heat dissipation module 230c is attached to the front substrate by an adhesive sheet, and is directly attached to the photoelectric panel, so as to dissipate heat, received by thermal conduction from the photoelectric module 220, to the outside.

The heat dissipation module 230c includes a support 231 for supporting the photoelectric module 220, and a plurality of dissipating parts 232 protruding from a side surface of the support 231 and dissipating heat of the support 231.

The heat dissipation module 230c may include the support 231 and the dissipating parts 232 which are integrally formed with each other as one module, and which may be formed by injection molding using one material.

The heat dissipation module 230c may be made of metal having high thermal conductivity, e.g., steel, an alloy including copper, etc., but the material is not limited thereto.

Unlike FIG. 5A, the support 231 may be formed as a metal plate extending from the lower side of the photoelectric module 220 along the X axis and having a predetermined length along the Z axis.

The dissipating parts 234a and 234b includes a plurality of heat dissipation fins 234a and 234b protruding in opposite directions from both sides of the support 231 along the Y axis.

The first heat dissipation fin 234a is formed as a fin protruding from the support 231 along the Y axis, arranged in a row along the Z axis, having a heat dissipating surface with X and Y axes as sides, and having a small thickness. That is, the plurality of heat dissipation fins 234a may be formed on a first side surface of the support 231 in a comb type structure.

The second heat dissipation fin 234b is formed as a fin protruding from the support 231 in a direction opposite to the first heat dissipation fin 234a along the Y axis, arranged in a row along the Z axis, having a heat dissipating surface with Y and X axes as sides, and having a small thickness. That is, the plurality of heat dissipation fins 234b may be formed on a second side surface of the support 231 in a comb type structure.

As described above, heat absorbed by the support 231 is dissipated to a space between the heat dissipation fins 234a and 234b, formed on both side surfaces of the support 231, and to the outside of the end of the heat dissipation fins 233, 232a, and 232b. The heat dissipation module 230c may further include a heat dissipation fan 270 for circulating heat to the lower side of the heat dissipation fins 234a and 234b.

In the drawing, an example is illustrated in which the wireless power reception module 200a has the photoelectric module 220 formed on an upper surface thereof, and the heat dissipation module 230b formed on a lower surface thereof, but the upper and lower surfaces of the display apparatus 100 are disposed opposite to those of the example, with a light receiving surface of the photoelectric module 220 facing downward.

Accordingly, the photoelectric module 220 is disposed so as to face the opening 217 of the wireless power transmission module 200b which is disposed on the lower side.

Hereinafter, a wireless power reception module according to still another embodiment of the present disclosure will be described below with reference to FIG. 5D.

The photoelectric module 220 is a cell device that is activated by the received laser light and is converted into an electrical current, and includes a plurality of photoelectric cells 221 which are arrayed in a longitudinal direction of the bar-type photoelectric module 220.

The plurality of photoelectric cells 221 may be formed as a plurality of photodiodes. That is, the photoelectric module 220 includes a plurality of photodiodes formed on one substrate, to form one bar-type photoelectric panel. The photoelectric panel may include: a sealing layer for sealing the photoelectric cells 221 by covering the photoelectric cells 221; a front substrate disposed on a front surface of the photodiode on one surface of the sealing layer; and a rear substrate disposed on a rear surface of the photodiode on the other surface of the sealing layer.

The configuration of the photoelectric module 220 is the same as that of FIG. 5A, such that a detailed description thereof will be omitted.

A heat dissipation module 230d is provided for supporting the photoelectric module 220 and for dissipating heat, generated by the photoelectric module 220 during photoelectric conversion, to the outside.

When light is incident from the rear substrate of the photoelectric panel as illustrated in FIG. 5D, the heat dissipation module 230d is attached to the front substrate by an adhesive sheet, and is directly attached to the photoelectric panel, so as to dissipate heat, received by thermal conduction from the photoelectric module 220, to the outside.

The heat dissipation module 230d includes a support 231 for supporting the photoelectric module 220, and a plurality of dissipating parts 232 protruding from the side surface of the support 231 and dissipating heat of the support 231.

The heat dissipation module 230d may include the support 231 and the dissipating parts 237a and 237b which are integrally formed as one module, and which may be formed by injection molding using one material.

The heat dissipation module 230d may be made of metal having high thermal conductivity, e.g., steel, an alloy including copper, etc., but the material is not limited thereto.

Unlike FIG. 5A, the support 231 may be formed as a metal plate having a hexahedral shape, extending from the lower side of the photoelectric module 220 along the X axis and having a predetermined length along the Z axis.

The dissipating parts 237a and 237b includes a plurality of heat dissipation fins 237a and 237b protruding in opposite directions from both sides of the support 231 along the Y axis.

The first heat dissipation fin 237a is formed as a fin protruding from the support 231 along the Y axis, arranged in a row along the Z axis, having a heat dissipating surface with Y and Z axes as sides, and having a small thickness.

That is, the plurality of heat dissipation fins 237a may be formed on a first side surface of the support 231 in a comb type structure.

The second heat dissipation fin 237b is formed as a fin protruding from the support 231 in a direction opposite to the first heat dissipation fin 237a along the Y axis, arranged in a row along the X axis, having a heat dissipating surface with Y and Z axes as sides, and having a small thickness. That is, the plurality of heat dissipation fins 237b may be formed on a second side surface of the support 231 in a comb type structure.

As described above, heat absorbed by the support 231 is dissipated to a space between the heat dissipation fins 237a and 237b, formed on both side surfaces of the support 231, and to the outside of the end of the heat dissipation fins 237a and 237b.

The heat dissipation module 230 of FIG. 5D may further include a heat dissipation fan on a lower side of the heat dissipation fins 237a and 237b.

In the drawing, an example is illustrated in which the wireless power reception module 200a has the photoelectric module 220 formed on an upper surface thereof, and the heat dissipation module 230 formed on a lower surface thereof, but the upper and lower surfaces of the display apparatus 100 are disposed opposite to those of the example, with a light receiving surface of the photoelectric module 220 facing downward.

Accordingly, the photoelectric module 220 is disposed so as to face the opening 217 of the wireless power transmission module 200b which is disposed on the lower side.

Laser light, emitted from the wireless power transmission module 200b and having a rectangular cross-section of a bar type, is absorbed by the photoelectric module 220 of the wireless power reception module 200a and is converted into an electrical current to be converted into various voltages by the controller 260 of FIG. 2.

To this end, the controller 260 may include a dc-dc converter and the like, and appropriate levels of power may be supplied to various modules of the display apparatus 100.

FIG. 6 is a diagram illustrating heat generated in the wireless power reception module of FIG. 5D, and FIG. 7 is a graph of output efficiency in an optical array of the wireless power transmission module of FIG. 2.

Referring to FIG. 6, by installing the heat dissipation module 230d including the heat dissipation fan 270, heat generated in the photoelectric module 220 may be dissipated effectively from the photoelectric module 220 to the surrounding atmosphere by heat dissipation of the heat dissipation fan 270 and the heat dissipation module 230d.

That is, the heat generated in the photoelectric module 220 may be transmitted not only to the lower side of the photoelectric module 220 but also to the side surface of the heat dissipation module 230 disposed on the lower side, such that the heat may be dissipated to the outside, and heat dissipation efficiency may be improved. Accordingly, efficiency may be guaranteed by preventing a device failure caused by heat generated in the photoelectric module 220.

As described above, when the wireless power transmission/reception module 200 is applied to the display apparatus 100, wireless power may be transmitted using laser light, such that there is no limitation on a separation distance, and a large amount of power may be transmitted.

In this case, by using an optical module in the transmission module 200b for power transmission, and diffracting light into a desired shape to cause a change in the shape of a cross-section of the light, light may be transmitted according to the shape of the reception module 200a.

An output loss caused when the optical module is applied is illustrated in FIG. 7.

Graph f1 shows a case where the optical module is included, and graph fo shows transmission values when light is transmitted directly through an optical fiber without the optical module. With respect to specific input values, values output through the optical module are about 8% to 9% lower than those in the case where no optical module is included.

It is considered that the output loss is caused when passing through the optical module, but despite the loss, there is a slight leakage of light from a receiving end of the reception module 200a by changing the shape of a cross-section of light according to the shape of the receiving end of the reception module 200a and transmitting the light, thereby maintaining a high transmission efficiency.

[description of reference]

| | |
|---|---|
| 100: display apparatus | 110: display |
| 200: wireless power transmission/ reception apparatus | |
| 200a: wireless power reception module | |
| 200b: wireless power transmission module | |
| 220: photoelectric module | |
| heat dissipation module: 230 | light source: 250 |
| 240, 260: controller | |

What is claimed is:

1. A display system comprising:
    a display apparatus including:
       a display configured to display images, and
       a bezel surrounding the display;
    a wireless power reception module configured to supply power to the display apparatus; and
    a wireless power transmission apparatus configured to emit an output laser beam toward the wireless power reception module,
    wherein the wireless power reception module is formed as a bar type on the bezel of the display, the wireless power reception module including:
       a bar-type photoelectric module disposed facing the wireless power transmission module, and
       a heat dissipation module coming into contact with the bar-type photoelectric module and configured to dissipate heat of the bar-type photoelectric module to outside thereof, and
    wherein the wireless power transmission module comprises a light source configured to emit light of a specific wavelength as a laser beam, and a light shaping unit configured to shape the light of the light source into shaped light and to convert the shaped light into the output laser beam having a different cross-section and output the output laser beam.

2. The display system of claim 1, wherein the light source generates the laser beam in an infrared wavelength range.

3. The display system of claim 1, wherein upon receiving the laser beam having a circular cross-section from the light source, the light shaping unit shapes the laser beam into the output laser beam having a rectangular cross-section and outputs the output laser beam having the rectangular cross-section.

4. The display system of claim 3, wherein the light shaping unit comprises:
    a beam expander configured to convert a first circular laser beam having a first diameter, which is received from the light source, into a second circular laser beam having a second diameter; and a diffractive optical element (DOE), which upon receiving the second circular laser beam having the second diameter from the beam expander, is configured to shape the second circular laser beam into the output laser beam having the rectangular cross-section and to output the output laser beam having the rectangular cross-section.

5. The display system of claim 4, wherein the second diameter is an integer multiple of the first diameter.

6. The display system of claim 4, wherein the bar-type photoelectric module comprises a plurality of photodiodes arranged in a longitudinal direction of the bar-type photoelectric module, and the photodiodes receive the output laser beam and convert the output laser beam into an electrical current.

7. The display system of claim 6, wherein the heat dissipation module comprises:
   a support coming into contact with the bar-type photoelectric module; and
   a dissipating part protruding from the support and dissipating heat of the support.

8. The display system of claim 7, wherein the dissipating part comprises a plurality of heat dissipation fins protruding from a lower side of the support and arranged in a row.

9. The display system of claim 8, wherein the dissipating part further comprises a plurality of heat dissipation fins protruding around the bar-type photoelectric module on an upper side of the support.

10. The display system of claim 7, wherein the support comprises a plurality of heat dissipation fins protruding by a predetermined length from a lower side of the bar-type photoelectric module and protruding from a side surface of the support.

11. The display system of claim 4, wherein the wireless power transmission module is spaced apart from the wireless power reception module by a predetermined distance.

* * * * *